(12) United States Patent
Inoue

(10) Patent No.: US 11,329,289 B2
(45) Date of Patent: May 10, 2022

(54) THICKENER POWDER FOR LITHIUM-ION BATTERY, WATER-BASED ELECTRODE SLURRY, ELECTRODE FOR LITHIUM-ION BATTERY, LITHIUM-ION BATTERY, METHOD FOR MANUFACTURING WATER-BASED ELECTRODE SLURRY FOR LITHIUM-ION BATTERY, AND METHOD FOR MANUFACTURING ELECTRODE FOR LITHIUM-ION BATTERY

(71) Applicant: ENVISION AESC JAPAN LTD., Zama (JP)

(72) Inventor: Takashi Inoue, Kanagawa (JP)

(73) Assignee: ENVISION AESC JAPAN LTD., Zama (JP)

( * ) Notice: Subject to any disclaimer, the term of this patent is extended or adjusted under 35 U.S.C. 154(b) by 315 days.

(21) Appl. No.: 16/083,258

(22) PCT Filed: Mar. 3, 2017

(86) PCT No.: PCT/JP2017/008513
§ 371 (c)(1),
(2) Date: Sep. 7, 2018

(87) PCT Pub. No.: WO2017/154776
PCT Pub. Date: Sep. 14, 2017

(65) Prior Publication Data
US 2019/0027757 A1      Jan. 24, 2019

(30) Foreign Application Priority Data

Mar. 8, 2016   (JP) .............................. JP2016-044067

(51) Int. Cl.
*H01M 4/62* (2006.01)
*C09K 3/00* (2006.01)
(Continued)

(52) U.S. Cl.
CPC ............... *H01M 4/622* (2013.01); *C09K 3/00* (2013.01); *H01M 4/62* (2013.01); *H01M 4/663* (2013.01);
(Continued)

(58) Field of Classification Search
CPC .... H01M 4/62; H01M 4/622; H01M 10/0525; H01M 4/133; H01M 4/1393; H01M 4/621; H01M 4/663; C09K 3/00
(Continued)

(56) References Cited

U.S. PATENT DOCUMENTS

2011/0229760 A1      9/2011  Hidaka et al.
2012/0321948 A1*    12/2012  Oya ..................... H01M 4/0404
                                                            429/211
2013/0202781 A1      8/2013  Kobayashi

FOREIGN PATENT DOCUMENTS

JP       01-320761 A      12/1989
JP       2005-285461 A    10/2005
(Continued)

OTHER PUBLICATIONS https://www.filterbag.com/U-S-Mesh-vs-Micron-21.html; accessed Sep. 25, 2020 (Year: 2020).*

(Continued)

*Primary Examiner* — Jonathan G Jelsma
*Assistant Examiner* — Omar M Kekia
(74) *Attorney, Agent, or Firm* — Sughrue Mion, PLLC

(57) ABSTRACT

Thickener powder for a lithium-ion battery of the present invention is thickener powder that is used to thicken a water-based electrode slurry for a lithium-ion battery, the thickener powder includes a cellulose-based water-soluble polymer, and a content of a water-insoluble component in the thickener powder, which is calculated from Condition 1, is equal to or less than 1.0% by mass.

(Continued)

(Condition 1: The thickener powder is dissolved in water, thereby obtaining a thickener aqueous solution having a concentration of 1.3% by mass. Next, the thickener aqueous solution is filtered using a filter having an average pore diameter of 1 μm. Next, the water-insoluble component remaining on the filter is dried, and a mass of the water-insoluble component is measured. Next, the content of the water-insoluble component in the thickener powder is calculated.)

10 Claims, 2 Drawing Sheets

(51) Int. Cl.
  *H01M 4/66* (2006.01)
  *H01M 10/0525* (2010.01)
  *H01M 4/133* (2010.01)
  *H01M 4/1393* (2010.01)

(52) U.S. Cl.
  CPC ........ *H01M 10/0525* (2013.01); *H01M 4/133* (2013.01); *H01M 4/1393* (2013.01); *H01M 4/621* (2013.01)

(58) Field of Classification Search
  USPC .......................................................... 429/217
  See application file for complete search history.

(56) References Cited

FOREIGN PATENT DOCUMENTS

| JP | 2006-024550 A | 1/2006 |
| JP | 2006-107896 A | 4/2006 |
| WO | 2010/061871 A1 | 6/2010 |
| WO | 2012/046305 A1 | 4/2012 |

OTHER PUBLICATIONS

International Search Report for PCT/JP2017/008513 dated May 30, 2017 [PCT/ISA/210].

* cited by examiner

150

THICKENER POWDER FOR LITHIUM-ION BATTERY, WATER-BASED ELECTRODE SLURRY, ELECTRODE FOR LITHIUM-ION BATTERY, LITHIUM-ION BATTERY, METHOD FOR MANUFACTURING WATER-BASED ELECTRODE SLURRY FOR LITHIUM-ION BATTERY, AND METHOD FOR MANUFACTURING ELECTRODE FOR LITHIUM-ION BATTERY

CROSS REFERENCE TO RELATED APPLICATIONS

This application is a National Stage of International Application No. PCT/JP2017/008513 filed Mar. 3, 2017, claiming priority based on Japanese Patent Application No. 2016-044067 filed Mar. 8, 2016, the content of which is incorporated herein by reference.

TECHNICAL FIELD

The present invention relates to thickener powder for a lithium-ion battery, a water-based electrode slurry, an electrode for a lithium-ion battery, a lithium-ion battery, a method for manufacturing a water-based electrode slurry for a lithium-ion battery, and a method for manufacturing an electrode for a lithium-ion battery.

BACKGROUND ART

An electrode that is used in a lithium-ion battery is generally constituted mainly of an electrode active material layer and a collector. The electrode active material layer is obtained by, for example, applying and drying a water-based electrode slurry including an electrode active material, a thickener, a water-based binder, or the like on the surface of the collector such as a metal foil.

As a method for manufacturing an electrode for a lithium-ion battery, for example, the methods described in Patent Document 1 and Patent Document 2 are exemplified.

Patent Document 1 (Japanese Unexamined Patent Publication No. 2006-24550) describes a method for manufacturing an electrode plate for a positive electrode of a non-water-based secondary battery including a step a of preparing a mixture paint including a mixture including an active material A, a conductive material B, a binding material C, and a thickener D and a liquid-form component E that dissolves the thickener D, the conductive material B being made of at least a carbon material, the thickener D being made of at least a water-soluble polymer, and the liquid-form component E being made of at least water and a step b of applying the mixture paint onto a collector, in which the step a of preparing the mixture paint has a primary kneading step of obtaining a primary kneaded substance by kneading a blend including the active material A, the conductive material B, and the powder-state thickener D together with the liquid-form component E and a secondary kneading step of obtaining a secondary kneaded substance by kneading the primary kneaded substance together with the binding material C and another liquid-form component.

Patent Document 2 (Japanese Unexamined Patent Publication No. 2006-107896) describes a method for manufacturing an electrode plate for a negative electrode of a non-water-based secondary battery using a paste constituted by kneading and dispersing a carbon material containing graphite as a main component, a thickener, and a binding material, in which the graphite contains equal to or less than 500 ppm of iron, the thickener is a water-soluble polymer including a carboxyl group, the binding material is a water-dispersive polymer having a polar group, a step of kneading a paste for forming a negative electrode coating includes three steps of an initial kneading step of adding the thickener in a powder state to at least graphite and stirring the thickener together with a dispersion medium, a dilution and kneading step of diluting and kneading the kneaded substance of the initial kneading step using the dispersion medium, and a finishing kneading step of adding and kneading the binding material to the kneaded substance of the dilution and kneading step, thereby producing a paste, and the shear force of the kneading in the initial kneading step is equal to or more than 2.5 times the shear force of the kneading in the dilution and kneading step and the finishing kneading step.

RELATED DOCUMENT

Patent Document

[Patent Document 1] Japanese Unexamined Patent Publication No. 2006-24550
[Patent Document 2] Japanese Unexamined Patent Publication No. 2006-107896

SUMMARY OF THE INVENTION

Technical Problem

According to the present inventors' studies, it has been clarified that water-based electrode slurries obtained using a method as described in Patent Documents 1 and 2 have a viscosity that varies depending on lots or changes during storage and there are cases in which the quality is not stable. In addition, it has been clarified that, in electrodes produced using the above-described water-based electrode slurry having an unstable quality, aggregates are likely to be generated.

Furthermore, according to the present inventors' studies, it has been clarified that water-based electrode slurries obtained using a method in which a thickener aqueous solution is added in a split manner during the preparation of the water-based electrode slurries also have a viscosity that varies depending on lots or changes during storage and there are cases in which the quality is not stable.

That is, according to the present inventors' studies, it has been clarified that water-based electrode slurries of the related art have poor quality stability.

The present invention has been made in consideration of the above-described circumstances and provides thickener powder for a lithium-ion battery from which water-based electrode slurries having excellent quality stability can be stably obtained, a water-based electrode slurry having excellent quality stability, an electrode for a lithium-ion battery having an excellent appearance, and a lithium-ion battery for which the electrode is used.

Solution to Problem

The present inventors repeated intensive studies in order to achieve the above-described object. As a result, the present inventors found that a criterion referred to as the content of a water-insoluble component in thickener powder which is calculated from a specific condition is effective as a design guide for stably obtaining water-based electrode slurries having excellent quality stability and completed the present invention.

According to the present invention, there is provided thickener powder that is used to thicken a water-based electrode slurry for a lithium-ion battery, the thickener powder including: a cellulose-based water-soluble polymer, in which a content of a water-insoluble component in the thickener powder, which is calculated from Condition 1, is equal to or less than 1.0% by mass.

(Condition 1: the thickener powder is dissolved in water, thereby obtaining a thickener aqueous solution having a concentration of 1.3% by mass, then, the thickener aqueous solution is filtered using a filter having an average pore diameter of 1 μm, then, the water-insoluble component remaining over the filter is dried, and a mass of the water-insoluble component is measured, and then, the content of the water-insoluble component in the thickener powder is calculated.)

In addition, according to the present invention, there is provided a water-based electrode slurry including:

an electrode active material being selected from a positive electrode active material and a negative electrode active material, a water-based binder, the thickener powder for a lithium-ion battery; and a water-based medium, in which the thickener powder for a lithium-ion battery is dissolved in the water-based medium.

In addition, according to the present invention, there is provided an electrode for a lithium-ion battery including:

an electrode active material being selected from a positive electrode active material and a negative electrode active material, a water-based binder, and the thickener powder for a lithium-ion battery.

In addition, according to the present invention, there is provided a lithium-ion battery including at least:

a positive electrode; an electrolyte; and a negative electrode, in which at least one of the positive electrode and the negative electrode includes the electrode for a lithium-ion battery.

In addition, according to the present invention, there is provided a method for manufacturing a water-based electrode slurry for a lithium-ion battery including an electrode active material being selected from a positive electrode active material and a negative electrode active material, a water-based binder, a thickener, and a water-based medium, the method including:

a step of filtering a thickener aqueous solution using a filter;

a step of obtaining thickener powder by drying the filtered thickener aqueous solution; and a step of preparing a water-based electrode slurry by mixing the electrode active material, the water-based binder, the obtained thickener powder, and the water-based medium.

In addition, according to the present invention, there is provided a method for manufacturing an electrode for a lithium-ion battery including:

a step of preparing a water-based electrode slurry using the method for manufacturing a water-based electrode slurry for a lithium-ion battery; and a step of forming an electrode active material layer over a base material by applying the obtained water-based electrode slurry over the base material, drying the applied water-based electrode slurry, and removing the water-based medium.

Advantageous Effects of Invention

According to the present invention, it is possible to provide thickener powder for a lithium-ion battery from which water-based electrode slurries having excellent quality stability can be stably obtained, a water-based electrode slurry having excellent quality stability, an electrode for a lithium-ion battery having an excellent appearance, and a lithium-ion battery for which the electrode is used.

BRIEF DESCRIPTION OF THE DRAWINGS

The above-described object and other objects, characteristics, and advantages will be further clarified using preferred embodiment described below and the accompanying drawings below.

DESCRIPTION OF EMBODIMENTS

Figure 1:
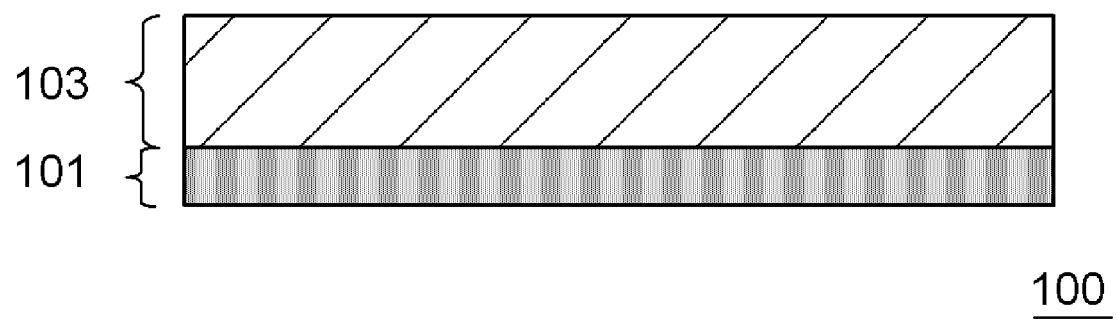
FIG. 1 is a cross-sectional view showing an example of a structure of an electrode for a lithium-ion battery of an embodiment according to the present invention.

Hereinafter, an embodiment of the present invention will be described using drawings. In all of the drawings, the same constituent element will be given the same reference sign and will not be repeated. In addition, individual constituent elements in the drawings schematically show shapes, sizes, and positional relationships so that the present invention can be understood, and thus the shapes, the sizes, and the positional relationships do not match actual ones.

Meanwhile, in the present embodiment, unless particularly otherwise described, a numerical range "A to B" indicates equal to and more than A and equal to and less than B.

<Thickener Powder for Lithium-Ion Battery (p)>

Thickener powder for a lithium-ion battery (p) according to the present embodiment is thickener powder that is used to thicken water-based slurries for a lithium-ion battery, includes a cellulose-based water-soluble polymer, and the content of a water-insoluble component in the thickener powder (p), which is calculated from Condition 1, is equal to or less than 1.0% by mass, preferably equal to or less than 0.8% by mass, more preferably equal to or less than 0.5% by mass, still more preferably equal to or less than 0.3% by mass, far still more preferably equal to or less than 0.1% by mass, and particularly preferably equal to or less than 0.08% by mass. In addition, the content of the water-insoluble component in the thickener powder (p) is preferably equal to or more than 0.01% by mass, more preferably equal to or more than 0.02% by mass, still more preferably equal to or more than 0.04% by mass, and far still more preferably equal to or more than 0.06% by mass.

Condition 1: The thickener powder is dissolved in water, thereby obtaining a thickener aqueous solution having a concentration of 1.3% by mass. Next, the thickener aqueous solution is filtered using a filter having an average pore diameter of 1 μm. Next, the water-insoluble component remaining on the filter is dried, and the mass of the water-insoluble component is measured. Next, the content of the water-insoluble component in the thickener powder (p) is calculated.

According to the present inventors' studies, it has been clarified that water-based electrode slurries obtained using a manufacturing method as described in Patent Documents 1 and 2 have a viscosity that varies depending on lots or changes during storage and there are cases in which the quality is not stable. In addition, it has been clarified that, in electrodes produced using the above-described water-based electrode slurry having an unstable quality, aggregates are likely to be generated.

Furthermore, according to the present inventors' studies, it has been clarified that water-based electrode slurries obtained using a method in which a thickener aqueous solution is added in a split manner during the preparation of the water-based electrode slurries also have a viscosity that varies depending on lots or changes during storage and there are cases in which the quality is not stable.

That is, according to the present inventors' studies, it has been clarified that water-based electrode slurries of the related art have poor quality stability.

The present inventors repeated intensive studies in order to achieve the above-described object. As a result, it has been clarified that thickener power that has been used in the related art includes a water-insoluble component and the inclusion of a specific amount of the water-insoluble component leads to the degradation of the quality stability of water-based electrode slurries to be obtained.

In addition, in the method in which a thickener aqueous solution is added in a split manner, the thickener aqueous solution is added even after a thick kneading step, and thus it has been clarified that the quality stability of water-based electrode slurries degrade.

Therefore, the present inventors further carried out intensive studies. As a result, it was found that the use of the thickener powder (p) having a content of a water-insoluble component, which is calculated from Condition 1, being equal to or less than the above-described upper limit value enables the stable obtainment of thickener aqueous solutions and water-based electrode slurries which have excellent quality stability. In addition, it was found that the use of a water-based electrode slurry obtained as described enables the stable obtainment of electrodes for a lithium-ion battery in which the generation of aggregates is suppressed and which have an excellent appearance.

That is, when the thickener power (p) according to the present invention in which the content of the water-insoluble component, which is calculated from Condition 1 is equal to or less than the above-described upper limit value is used, it is possible to stably obtain water-based electrode slurries having excellent quality stability. In addition, when the above-described water-based electrode slurry is used, it is possible to stably obtain electrodes for a lithium-ion battery having an excellent appearance.

The thickener powder (p) includes a cellulose-based water-soluble polymer as a main component. Here, the thickener powder including the cellulose-based water-soluble polymer as the main component means that the content of the cellulose-based water-soluble polymer in the thickener powder (p) is equal to or more than 50% by mass. The content of the cellulose-based water-soluble polymer in the thickener powder (p) is preferably equal to or more than 70% by mass, more preferably equal to or more than 90% by mass, and particularly preferably equal to or more than 99% by mass.

The cellulose-based water-soluble polymer is not particularly limited as long as the cellulose-based water-soluble polymer improves the coatability of water-based electrode slurries. As the cellulose-based water-soluble polymer, it is possible to use, for example, one or more selected from cellulose-based polymers such as carboxymethyl cellulose, hydroxymethyl cellulose, hydroxyethyl cellulose, methyl-ethylhydroxy cellulose, methyl cellulose, and hydroxypropyl cellulose, cellulose-based polymer salts such as ammonium salts and alkali metal salts of the above-described cellulose-based polymers, and the like.

Among them, the thickener powder preferably includes at least one selected from carboxymethyl cellulose and a carboxymethyl cellulose salt and more preferably includes one or more selected from carboxymethyl cellulose, an ammonium salt of carboxymethyl cellulose, a sodium salt of carboxymethyl cellulose, and a potassium salt of carboxymethyl cellulose.

In the thickener powder for a lithium-ion battery (p) according to the present embodiment, the water-insoluble component is not particularly limited, and, for example, the thickener powder may include a fiber component derived from the cellulose-based water-soluble polymer.

In the thickener powder for a lithium-ion battery (p) according to the present embodiment, a viscosity calculated from Condition 2 is preferably equal to or more than 10 mPa·s and equal to or less than 20,000 mPa·s, more preferably equal to or more than 100 mPa·s and equal to or less than 10,000 mPa·s, still more preferably equal to or more than 1,000 mPa·s and equal to or less than 8,000 mPa·s, and particularly preferably equal to or more than 2,000 mPa·s and equal to or less than 4,000 mPa·s.

Condition 2: The thickener powder (p) is dissolved in water, thereby obtaining a thickener aqueous solution having a concentration of 1.3% by mass. Next, the viscosity of the thickener aqueous solution is measured using a B-type viscometer under conditions of 25° C. and a shear rate of 3.4 $s^{-1}$.

In such a case, the coatability of water-based slurries to be obtained can be further improved.

<Method for Manufacturing Thickener Powder (p)>

Next, a method for manufacturing the thickener powder for a lithium-ion battery (p) according to the present embodiment will be described.

The thickener powder (p) according to the present embodiment can be obtained using, for example, a manufacturing method including at least Step (A) and Step (B) below. However, the method for manufacturing the thickener powder for a lithium-ion battery (p) according to the present embodiment is not limited to the following example.

Step (A): A step of filtering the thickener aqueous solution using a filter

Step (B): A step of obtaining the thickener powder (p) by drying the filtered thickener aqueous solution First, the thickener powder is dissolved in a water-based medium, thereby obtaining a thickener aqueous solution. Here, the thickener powder can be manufactured using a well-known method, but it is also possible to use a variety of commercially available products. In addition, a commercially available thickener aqueous solution may also be used.

The water-based medium that dissolves the thickener powder is not particularly limited, and it is possible to use, for example, distilled water, ion-exchange water, city water, industrial water, or the like. Among them, distilled water or ion-exchange water is preferred. In addition, a solvent that is highly hydrophilic to water such as an alcohol may be mixed into water.

The concentration of the thickener in the thickener aqueous solution is not particularly limited, but is, for example, 0.1% to 10% by mass and preferably 0.5% to 5% by mass.

A method for dissolving the thickener powder in the water-based medium is not particularly limited, and a well-known method can be employed.

Next, the obtained thickener aqueous solution is filtered using a filter. The average pore diameter of the filter is not particularly limited, but is, for example, preferably 0.1 to 5 µm and more preferably 0.2 to 3 µm. In such a case, it is possible to effectively remove the water-insoluble component and efficiently obtain the thickener powder (p) having a content of the water-insoluble component being equal to or less than the above-described upper limit value.

Next, the filtered thickener aqueous solution is dried, thereby obtaining the thickener powder (p). A method for drying the thickener aqueous solution is not particularly limited, and it is possible to use, for example, a freeze drying method in which the thickener aqueous solution is dried at a low temperature or a spray drying method.

In such a case, it is possible to dry the thickener in a powder form from the thickener aqueous solution and more efficiently obtain the thickener powder (p) according to the present embodiment.

<Water-Based Electrode Slurry>

Next, a water-based electrode slurry according to the present embodiment will be described.

The water-based electrode slurry according to the present embodiment includes an electrode active material (a) being selected from a positive electrode active material and a negative electrode active material, a water-based binder (b), and the thickener powder for a lithium-ion battery (p) according to the present embodiment, and a water-based medium (c), and the thickener powder for a lithium-ion battery (p) is dissolved in the water-based medium (c). In addition, the water-based electrode slurry according to the present embodiment preferably further includes an auxiliary conductive agent (d) from the viewpoint of improving the electron conductivity of electrodes to be obtained.

Here, in the water-based electrode slurry according to the present embodiment, the thickener powder for a lithium-ion battery (p) is dissolved in the water-based electrode slurry and is not in a powder state.

(Electrode Active Material (a))

The electrode active material (a) according to the present embodiment is appropriately selected depending on the use. When a positive electrode is produced, a positive electrode active material is used, and, when a negative electrode is produced, a negative electrode active material is used.

The positive electrode active material is not particularly limited as long as the positive electrode material is an ordinary positive electrode active material that can be used for positive electrodes in lithium-ion batteries. Examples thereof include complex oxides between lithium and a transition metal such as lithium nickel complex oxide, lithium cobalt complex oxide, lithium manganese complex oxide, and lithium-manganese-nickel complex oxide; transition metal sulfides such as $TiS_2$, FeS, and $MoS_2$; transition metal oxides such as MnO, $V_2O_5$, $V_6O_{13}$, and $TiO_2$; olivine-type lithium oxides, and the like.

Olivine-type lithium oxides include, for example, at least one element from the group consisting of Mn, Cr, Co, Cu, Ni, V, Mo, Ti, Zn, Al, Ga, Mg, B, Nb, and Fe, lithium, phosphorus, and oxygen. In the compounds, some of elements may be partially substituted with other elements in order to improve the characteristics.

Among them, olivine-type lithium iron phosphorus oxide, lithium cobalt complex oxide, lithium nickel complex oxide, lithium manganese complex oxide, and lithium-manganese-nickel complex oxide are preferred. These positive electrode active materials do not only have a high action potential but also have a large capacity and a large energy density.

The positive electrode active material may be used singly or two or more positive electrode active materials may be used in combination.

The negative electrode active material is not particularly limited as long as the negative electrode material is an ordinary negative electrode active material that can be used for negative electrodes in lithium-ion batteries. Examples thereof include carbon materials such as natural graphite, artificial graphite, resin charcoal, carbon fibers, activated charcoal, hard carbon, and soft carbon; lithium-based metals such as lithium metal and lithium alloys; metals such as silicon and tin; conductive polymers such as polyacene, polyacetylene, and polypyrrole; and the like. Among these, carbon materials are preferred, and graphite materials such as natural graphite and artificial graphite are particularly preferred.

The negative electrode active material may be used singly or two or more negative electrode active materials may be used in combination.

The content of the electrode active material (a) is preferably equal to or more than 70 parts by mass and equal to or less than 99.97 parts by mass and more preferably equal to or more than 85 parts by mass and equal to or less than 99.85 parts by mass when the total amount of the solid content of the water-based electrode slurry is set to 100 parts by mass.

(Water-Based Binder (b))

The water-based binder (b) is not particularly limited as long as the water-based binder is capable of forming electrodes and has sufficient electrochemical stability and examples thereof include polyacrylic acid, polytetrafluoroethylene, polyvinylidene fluoride, styrene butadiene rubber, polyimide, and the like. The water-based binder (b) may be used singly or two or more water-based binders may be used in combination. Among these, styrene butadiene rubber is preferred.

Meanwhile, in the present embodiment, the water-based binder (b) refers to a binder which disperses in a water-based medium and is capable of forming an emulsion aqueous solution.

The content of the water-based binder (b) is preferably equal to or more than 0.01 parts by mass and equal to or less than 10.0 parts by mass and more preferably equal to or more than 0.05 parts by mass and equal to or less than 5.0 parts by mass when the total amount of the solid content of the water-based electrode slurry is set to 100 parts by mass. When the content of the water-based binder (b) is in the above-described range, the balance between the coatability of the water-based electrode slurry, the binding property of the binder and the battery characteristics becomes more favorable.

Regarding the water-based binder (b), a powder-form water-based binder is dispersed in a water-based medium and used as an emulsion aqueous solution. In such a case, it is possible to improve the dispersibility of the water-based binder (b) without impairing the contact between the electrode active materials (a), between the auxiliary conductive agents (d), and between the electrode active material (a) and the auxiliary conductive agent (d).

The water-based medium in which the water-based binder (b) is dispersed is not particularly limited as long as the water-based medium is capable of dispersing the water-based binder (b), and it is possible to use distilled water, ion-exchange water, city water, industrial water, or the like. Among these, distilled water or ion-exchange water is preferred. In addition, a solvent that is highly hydrophilic to water such as an alcohol may be mixed into water.

(Thickener Powder (p))

As the thickener powder (p), it is possible to use the thickener powder (p) according to the present embodiment.

One kind of the thickener powder (p) may be used singly or two or more kinds of thickener powder may be used in combination. The content of the thickener powder (p) is preferably equal to or more than 0.01 parts by mass and equal to or less than 10.0 parts by mass and more preferably equal to or more than 0.05 parts by mass and equal to or less than 5.0 parts by mass when the total amount of the solid content of the water-based electrode slurry is set to 100 parts by mass. When the content of the thickener powder (p) is in the above-described range, the balance between the coatability of the water-based electrode slurry, the binding property of the binder and the battery characteristics becomes more favorable.

(Water-Based Medium (c))

The water-based medium (c) according to the present embodiment is not particularly limited, and it is possible to use, for example, distilled water, ion-exchange water, city water, industrial water, or the like. Among these, distilled water or ion-exchange water is preferred. In addition, a solvent that is highly hydrophilic to water such as an alcohol may be mixed into water.

(Auxiliary Conductive Agent (d))

The water-based electrode slurry according to the present embodiment preferably further includes an auxiliary conductive agent (d) from the viewpoint of improving the electron conductivity of electrodes.

The auxiliary conductive agent (d) is not particularly limited as long as the auxiliary conductive agent has electron conductivity and improves the conductive property of electrodes. Examples of the auxiliary conductive agent (d) according to the present embodiment include carbon materials such as acetylene black, Ketjen black, carbon black, carbon nanofibers, and graphite having a smaller particle diameter than graphite that is used as the active material. The auxiliary conductive agent (d) may be used singly or two or more auxiliary conductive agents may be used in combination.

The content of the auxiliary conductive agent (d) is preferably equal to or more than 0.01 parts by mass and equal to or less than 10.0 parts by mass and more preferably equal to or more than 0.05 parts by mass and equal to or less than 5.0 parts by mass when the total amount of the solid content of the water-based electrode slurry is set to 100 parts by mass.

When the content of the auxiliary conductive agent (d) is in the above-described range, the balance between the coatability of the water-based electrode slurry and the binding property of the binder becomes more favorable.

In the water-based electrode slurry of the present embodiment, the content of the electrode active material (a) is preferably equal to or more than 70 parts by mass and equal to or less than 99.97 parts by mass and more preferably equal to or more than 85 parts by mass and equal to or less than 99.85 parts by mass when the total amount of the solid content of the water-based electrode slurry is set to 100 parts by mass. In addition, the content of the water-based binder (b) is preferably equal to or more than 0.01 parts by mass and equal to or less than 10.0 parts by mass and more preferably equal to or more than 0.05 parts by mass and equal to or less than 5.0 parts by mass. In addition, the content of the thickener powder (p) is preferably equal to or more than 0.01 parts by mass and equal to or less than 10.0 parts by mass and more preferably equal to or more than 0.05 parts by mass and equal to or less than 5.0 parts by mass. In addition, the content of the auxiliary conductive agent (d) is preferably equal to or more than 0.01 parts by mass and equal to or less than 10.0 parts by mass and more preferably equal to or more than 0.05 parts by mass and equal to or less than 5.0 parts by mass.

When the contents of the respective components constituting the water-based electrode slurry are in the above-described ranges, the balance between the quality stability of the water-based electrode slurry and the battery characteristics of lithium-ion batteries to be obtained becomes more favorable.

<Method for Manufacturing Water-Based Electrode Slurry>

Next, a method for manufacturing the water-based electrode slurry according to the present embodiment will be described.

The method for manufacturing the water-based electrode slurry according to the present embodiment is a method for manufacturing a water-based electrode slurry for a lithium-ion battery including the electrode active material (a) being selected from a positive electrode active material and a negative electrode active material, the water-based binder (b), the thickener, and the water-based medium (c) and includes at least Step (A), Step (B), and Step (C) below.

Step (A): A step of filtering a thickener aqueous solution using a filter

Step (B): A step of obtaining the thickener powder (p) by drying the filtered thickener aqueous solution Step (C): A step of preparing a water-based electrode slurry by mixing the electrode active material (a), the water-based binder (b), the obtained thickener powder (p), and the water-based medium (c)

Step (A) and Step (B) are the same as Step (A) and Step (B) of the method for manufacturing the thickener powder (p) and will not be repeated. Hereinafter, Step (C) will be described.

In Step (C), the electrode active material (a), the water-based binder (b), the obtained thickener powder (p), and the water-based medium (c) are mixed together, thereby preparing a water-based electrode slurry. At this time, the auxiliary conductive agent (d) may be mixed together.

In addition, Step (C) preferably includes Steps (C-1) to (C-3) below. In such a case, it is possible to more stably obtain water-based electrode slurries having excellent quality stability.

Step (C-1): A step of preparing a mixture including the electrode active material (a) and the thickener powder (p) by dry-mixing the electrode active material (a) and the thickener powder (p) in a powder state Step (C-2): A step of preparing a slurry precursor by adding one or more liquid components selected from the water-based medium (c) and an emulsion aqueous solution including the water-based binder (b) to the mixture and wet-mixing the components in the mixture Step (C-3): A step of preparing the water-based electrode slurry by further adding one or more liquid components selected from the water-based medium (c) and the emulsion aqueous solution including the water-based binder (b) to the slurry precursor and wet-mixing the components in the slurry In Step (C-1), the electrode active material (a) and the thickener powder (p) are dry-mixed in a powder state, thereby preparing a mixture of powder including the electrode active material (a) and the thickener powder (p). At this time, the auxiliary conductive agent (d) may be powder-mixed together.

In the present embodiment, when Step (C-1) is carried out, it is possible to enhance the dispersibility of the electrode active material (a) and the thickener powder and further suppress the generation of a gel component derived from the thickener in the subsequent steps.

Therefore, it is possible to suppress the generation of a gel component derived from the thickener in water-based electrode slurries to be obtained.

From the present inventors' studies, it has been clarified that, in electrodes for a lithium-ion battery manufactured using a water-based electrode slurry obtained using a manufacturing method including a step of dry-mixing an electrode active material and thickener powder in a powder state, aggregates are likely to be generated.

Therefore, the present inventors further carried out intensive studies. As a result, it was found that the use of the thickener powder (p) according to the present embodiment enables the suppression of the generation of aggregates on the surface of electrodes and the stable obtainment of electrodes for a lithium-ion battery having an excellent appearance.

As a mixer that carries out the dry mixing, a sun-and-planet motion-type mixer is preferably used, and a sun-and-planet motion-type planetary mixer is more preferably used. When the above-described mixer is used, it is possible to sufficiently mix the electrode active material (a) and the thickener powder (p) while suppressing the scattering of the electrode active material (a) and the thickener powder (p). Meanwhile, the sun-and-planet motion-type mixer refers to a mixer having a rotation and revolution function as a stirring function. The sun-and-planet motion-type planetary mixer refers to a mixer having a blade with a rotation and revolution function as a stirring function.

In Step (C-2), one or more liquid components selected from the water-based medium (c) and an emulsion aqueous solution including the water-based binder (b) are added to the above-described mixture obtained in Step (C-1), and the components are wet-mixed together, thereby preparing a slurry precursor.

Step (C-2) preferably includes an accustoming step (C-2-1) and a thick kneading step (C-2-2). The accustoming step (C-2-1) is a step of accustoming one or more liquid components selected from the water-based medium (c) and the emulsion aqueous solution including the water-based binder (b) to a powder mixture. When the accustoming step (C-2-1) is included, it is possible to suppress the powder mixture rising to the edge of the mixer during the wet mixing, the uneven wetting of the powder mixture, the scattering of the powder mixture during kneading, and the like.

In addition, the thick kneading step (C-2-2) is a step in which the rate of the wet mixing is set to be higher than in the accustoming step (C-2-1), the powder mixture and the liquid components are mixed together, and a slurry precursor is obtained.

As a mixer that carries out the wet mixing in Step (C-2), a sun-and-planet motion-type mixer is preferably used, and a sun-and-planet motion-type planetary mixer is more preferably used. When the above-described mixer is used, it is possible to enhance the dispersibility of the respective materials while suppressing the scattering of the respective materials constituting the water-based electrode slurry.

The rotation speed of the wet mixing in the accustoming step (C-2-1) is not particularly limited, but is preferably in a range of equal to or more than 0.10 m/sec and equal to or less than 0.50 m/sec.

When the rotation speed of the wet mixing in the accustoming step (C-2-1) is in the above-described range, it is possible to sufficiently accustom the liquid components to the powder mixture while more effectively suppressing the powder mixture rising to the edge of the mixer during the wet mixing, the uneven wetting of the powder mixture, the scattering of the powder mixture during kneading, and the like.

In addition, the revolution speed of the wet mixing in the accustoming step (C-2-1) is not particularly limited, but is preferably in a range of equal to or more than 0.01 m/sec and equal to or less than 0.10 m/sec.

When the revolution speed of the wet mixing in the accustoming step (C-2-1) is in the above-described range, it is possible to sufficiently accustom the liquid components to the powder mixture while more effectively suppressing the powder mixture rising to the edge of the mixer during the wet mixing, the uneven wetting of the powder mixture, the scattering of the powder mixture during kneading, and the like.

The mixing time of the wet mixing in the accustoming step (C-2-1) is not particularly limited, but is, for example, preferably equal to or longer than 0.1 minutes and equal to or shorter than 30 minutes.

The rotation speed of the wet mixing in the thick kneading step (C-2-2) is preferably in a range of equal to or more than 0.60 m/sec and equal to or less than 10.00 m/sec.

When the rotation speed of the wet mixing in the thick kneading step (C-2-2) is in the above-described range, it is possible to set a shear force being applied to the slurry precursor to be more appropriate, and thus it is possible to more easily crush the gel component derived from the thickener while suppressing the cutting of the molecular chain of the thickener and further suppress the generation of the gel component derived from the thickener in water-based electrode slurries to be obtained.

In addition, the revolution speed of the wet mixing in the thick kneading step (C-2-2) is preferably in a range of equal to or more than 0.20 m/sec and equal to or less than 3.00 m/sec.

When the revolution speed of the wet mixing in the thick kneading step (C-2-2) is in the above-described range, it is possible to set the shear force being applied to the slurry precursor to be more appropriate, and thus it is possible to more easily crush the gel component derived from the thickener while suppressing the cutting of the molecular chain of the thickener and further suppress the generation of the gel component derived from the thickener in water-based electrode slurries to be obtained.

The mixing time of the wet mixing in the thick kneading step (C-2-2) is not particularly limited, but is, for example, preferably equal to or longer than 10 minutes and 180 minutes.

In Step (C-2), the solid content concentration of the slurry precursor is preferably adjusted to equal to or more than 30.0% by mass and equal to or less than 70.0% by mass. In such a case, it is possible to set the shear force being applied to the slurry precursor to be more appropriate, and thus it is possible to enhance the dispersibility of the respective materials while suppressing the cutting of the molecular chain of the thickener.

The solid content concentration of the slurry precursor can be adjusted by adjusting the concentration or addition amount of the liquid components.

In Step (C-3), one or more liquid components selected from the water-based medium (c) and the emulsion aqueous solution including the water-based binder (b) is further added to the slurry precursor obtained in Step (C-2), and the components are wet-mixed, thereby preparing the water-based electrode slurry.

As a mixer that carries out the wet mixing, a sun-and-planet motion-type mixer is preferably used, and a sun-and-planet motion-type planetary mixer is more preferably used. When the above-described mixer is used, it is possible to sufficiently mix the components under stirring at a low speed. Therefore, it is possible to suppress the cutting of the molecular chain of the thickener by stirring and mixing and enhance the dispersibility of the respective materials constituting the water-based electrode slurry while suppressing the aggregation of the water-based binder (b). In addition, as a result, it is possible to obtain water-based electrode slurries having more favourable quality stability.

In addition, since a water-based electrode slurry to be obtained has more favourable dispersibility, the use of the above-described water-based electrode slurry enables the obtainment of more uniform electrode active material layers. As a result, it is possible to obtain lithium-ion batteries having more favourable battery characteristics.

In the present embodiment, it is preferable to set at least one of the rotation speed and the revolution speed of the wet mixing in Step (C-3) and preferably both of the rotation speed and the revolution speed to be less than the rotation speed of the wet mixing in the thick kneading step (C-2-2). In such a case, it is possible to enhance the dispersibility of the respective materials constituting the water-based electrode slurry while further suppressing the aggregation of the water-based binder (b) by stirring and mixing.

The mixing time of the wet mixing in Step (C-3) is not particularly limited, but is, for example, preferably equal to or longer than 5 minutes and equal to or shorter than 60 minutes.

Meanwhile, the solid content concentration of the water-based electrode slurry can be adjusted by adjusting the concentration or addition amount of the liquid components.

In the method for manufacturing the water-based electrode slurry according to the present embodiment, Step (D) which is a vacuum defoaming step may be further carried out. In such a case, it is possible to remove air bubbles engulfed into the slurry and improve the coatability of the slurry.

As the vacuum defoaming, air bubbles may be removed by carrying out a sealing treatment on a container or an axial portion of the mixer or the vacuum defoaming may be carried out after moving the slurry to a separate container.

<Electrode for Lithium-Ion Battery>

An electrode for a lithium-ion battery 100 according to the present embodiment includes the electrode active material (a) being selected from a positive electrode active material and a negative electrode active material, the water-based binder (b), and the thickener powder for a lithium-ion battery (p).

<Method for Manufacturing Electrode for Lithium-Ion Battery>

Next, a method for manufacturing the electrode for a lithium-ion battery 100 according to the present embodiment will be described. FIG. 1 is a cross-sectional view showing an example of the structure of the electrode for a lithium-ion battery of the embodiment according to the present invention.

The method for manufacturing the electrode for a lithium-ion battery 100 according to the present embodiment includes at least two steps of (1) and (2) below. Therefore, it is possible to stably obtain electrodes for a lithium-ion battery having an excellent appearance.

(1) A step of preparing a water-based electrode slurry using the method for manufacturing the water-based electrode slurry for a lithium-ion battery according to the present embodiment (2) A step of forming an electrode active material layer on a base material by applying the obtained water-based electrode slurry on the base material, drying the applied water-based electrode slurry, and removing a water-based medium Step (1) is the same as that of the above-described method for manufacturing the water-based electrode slurry for a lithium-ion battery according to the present embodiment and thus will not be repeated. Hereinafter, Step (2) will be described.

In Step (2) of forming an electrode active material layer, for example, the water-based electrode slurry obtained in Step (1) is applied and dried on a base material 101 and a water-based medium is removed so as to form an electrode active material layer 103 on the base material 101, thereby obtaining the electrode for a lithium-ion battery 100 having the electrode active material layer 103 formed on the base material 101.

As a method for applying the water-based electrode slurry onto the base material 101, generally, a well-known method can be used. For example, a reverse roll method, a direct roll method, a doctor blade method, a knife method, an extrusion method, a curtain method, a gravure method, a bar method, a dip method, a squeeze method, and the like can be exemplified.

The water-based electrode slurry may be applied to only one surface of the base material 101 or applied to both surfaces. In the case of being applied to both surfaces of the base material 101, the water-based electrode slurry may be applied sequentially one by one or applied at the same time to both surfaces. In addition, the water-based electrode slurry may be continuously or intermittently applied to the surface of the base material 101. The thickness, length, or width of a coating layer can be appropriately determined depending on the size of batteries.

As a method for drying the applied water-based electrode slurry, generally, a well-known method can be used. For example, it is possible to use hot air, vacuum, infrared rays, far-infrared rays, and low-temperature air singly or in combination. The drying temperature is, for example, in a range of equal to or higher than 30° C. and equal to or lower than 350° C.

As the base material 101 that is used to manufacture the electrode for a lithium-ion battery 100 according to the present embodiment, for example, an ordinary collector that can be used in lithium-ion batteries can be used.

As a negative electrode collector, it is possible to use stainless steel, nickel, titanium, or an alloy thereof, and, among these, copper is particularly preferred.

As a positive electrode collector, it is possible to use aluminum, stainless steel, nickel, titanium, an alloy thereof, or the like, and, among these, aluminum is particularly preferred.

The shape of the collector is not particularly limited, and, for example, a foil-like collector having a thickness in a range of 0.001 to 0.5 mm can be used.

The electrode for a lithium-ion battery 100 according to the present embodiment may be pressed as necessary. As a pressing method, generally, a well-known method can be used. Examples thereof include a mold press method, a calender press method, and the like. The pressing pressure is not particularly limited and is, for example, in a range of 0.2 to 3 t/cm$^2$.

The thickness or density of the electrode for a lithium-ion battery 100 according to the present embodiment is appropriately determined depending on the intended use or the like of batteries and is thus not particularly limited and, generally, can be set according to well-known information.

<Lithium-Ion Battery>

Figure 2:
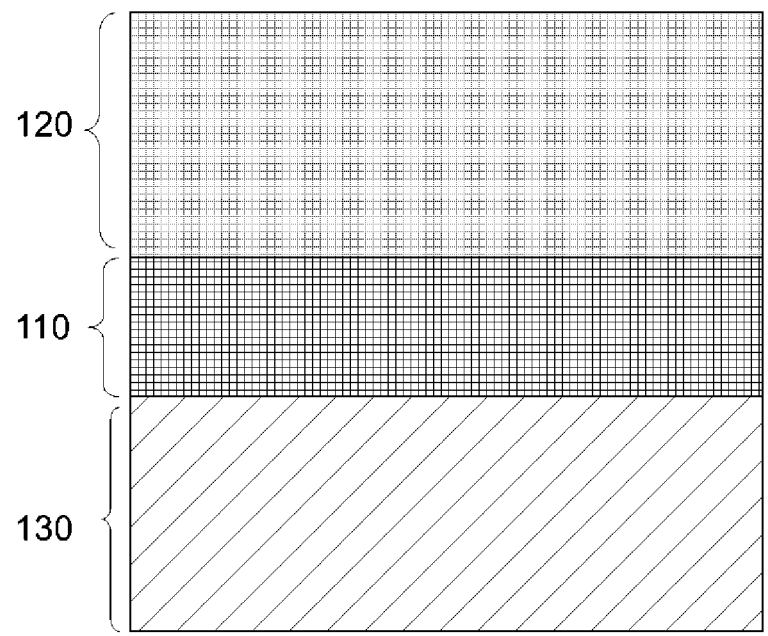
FIG. 2 is a cross-sectional view showing an example of a structure of a lithium-ion battery of an embodiment according to the present invention.

Subsequently, a lithium-ion battery 150 according to the present embodiment will be described. FIG. 2 is a cross-sectional view showing an example of the structure of the lithium-ion battery 150 of the embodiment according to the present invention.

The lithium-ion battery 150 according to the present embodiment includes at least a positive electrode 120, an electrolyte 110, and a negative electrode 130, and at least one of the positive electrode 120 and the negative electrode 130 includes the electrode 100 for a lithium-ion battery according to the present embodiment. In addition, the lithium-ion battery 150 according to the present embodiment may include a separator as necessary.

The lithium-ion battery 150 according to the present embodiment can be produced according to a well-known method.

As the electrodes, for example, a laminate or a coiled body can be used. As an exterior body, a metal exterior body or an aluminium-laminated exterior body can be appropriately used. The shape of the battery may be any shape of a coin shape, a button shape, a cylindrical shape, a square shape, and a flat shape.

As an electrolyte in an electrolytic solution of the battery, any of well-known lithium salts can be used and may be selected depending on the kind of active materials. Examples thereof include $LiClO_4$, $LiBF_6$, $LiPF_6$, $LiCF_3SO_3$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $CF_3SO_3Li$, $LiCF_3SO_3$, $LiC_4F_9SO_3$, $Li(CF_3SO_2)_2N$, short-chain fatty acid lithium carbonate, and the like.

A solvent that dissolves the electrolyte is not particularly limited as long as the solvent is a solvent that is ordinarily used as a liquid component that dissolves electrolytes, and examples thereof include carbonates such as ethylene carbonate (EC), propylene carbonate (PC), butylene carbonate (BC), dimethyl carbonate (DMC), diethyl carbonate (DEC), methyl ethyl carbonate (MEC), and vinylene carbonate (VC); lactones such as γ-butyrolactone and γ-valerolactone; ethers such as trimethoxymethane, 1,2-dimethoxyethane, diethyl ether, 2-ethoxyethane, tetrahydrofuran, and 2-methyltetrahydrofuran; sulfoxides such as dimethylsulfoxide; oxolanes such as 1,3-dioxolane and 4-methyl-1,3-dioxolane; nitrogen-containing solvents such as acetonitrile, nitromethane, formamide, and dimethylformamide; organic acid esters such as methyl formate, methyl acetate, ethyl acetate, butyl acetate, methyl propionate, and ethyl propionate; phosphoric acid triester and diglymes; triglymes; sulfolanes such as sulfolane and methylsulfolane; oxazolidinones such as 3-methyl-2-oxazolidinone; sultones such as 1,3-propane sultone, 1,4-butane sultone, and naphthasultone; and the like. These solvents may be used singly or two or more solvents may be used in combination.

As the separator, for example, a porous separator is exemplified. Examples of the form of the separator include a membrane, a film, a non-woven fabric, and the like.

Examples of the porous separator include polyolefin-based porous separators such as polypropylene-based separators and polyethylene-based separators and porous separators formed of polyvinylidene fluoride, polyethylene oxide, polyarylonitrile, a polyvinylidene fluoride hexafluoropropylene copolymer, or the like.

Hitherto, the embodiment of the present invention has been described, but this is an example of the present invention, and it is also possible to employ a variety of constitution other than what has been described above.

In addition, the present invention is not limited to the embodiment, and modification, improvement, and the like capable of achieving the object of the present invention are also included in the scope of the present invention.

EXAMPLES

Hereinafter, the present invention will be described using examples and comparative examples, but the present invention is not limited thereto.

Example 1

<Production of Thickener Powder A>

First, carboxymethyl cellulose powder (MAC series of SUNROSE (registered trademark) manufactured by Nippon Paper Industries Co., Ltd.) was dissolved in ion-exchange water at 20° C., thereby obtaining a thickener aqueous solution having a concentration of 1.3% by mass. Next, the obtained thickener aqueous solution was filtered using a filter having an average pore diameter of 1 μm.

Next, the filtered thickener aqueous solution was freeze-dried, thereby obtaining thickener powder A.

<Production of Water-Based Electrode Slurry>

(1) Step (C-1)

Graphite (960 g) which was a negative electrode active material, the thickener powder A (10 g), and carbon black (10 g) which was an auxiliary conductive agent were injected into a sun-and-planet motion-type planetary mixer.

Next, the components were dry-mixed at 20° C. for 60 minutes, thereby obtaining a powder mixture.

(2) Accustoming Step (C-2-1)

Next, water was added to the sun-and-planet motion-type planetary mixer in which Step (C-1) had been completed. After that, the components were wet-mixed under conditions of a rotation speed of 0.15 m/sec, a revolution speed of 0.04 m/sec, and a temperature of 20° C. for two minutes, thereby accustoming water to the powder mixture.

(3) Thick Kneading Step (C-2-2)

Next, the components were wet-mixed under conditions of a rotation speed of 4.50 m/sec, a revolution speed of 1.50 m/sec, and a temperature of 20° C. for 40 minutes, thereby obtaining a slurry precursor.

(4) Step (C-3)

Next, a styrene butadiene rubber (SBR) aqueous solution having a solid content concentration of 40% by mass obtained by dispersing SBR in water was prepared. The obtained SBR aqueous solution (50 g) was added to the sun-and-planet motion-type planetary mixer in which the thick kneading step (C-2-2) had been completed.

After that, the components were wet-mixed under conditions of a rotation speed of 0.25 m/sec, a revolution speed of 0.08 m/sec, and a temperature of 20° C. for 10 minutes.

(5) Step (D)

Next, vacuum defoaming was carried out, thereby obtaining a water-based electrode slurry.

Meanwhile, the solid content concentration of the water-based electrode slurry was adjusted to 50% by mass by adjusting the amount of water that was added in the accustoming step (C-2-1).

<Production of Negative Electrode>

The obtained water-based electrode slurry was applied onto a single surface of a copper foil which was a collector using a die coater and dried. Next, the obtained electrode was pressed, thereby obtaining a negative electrode.

<Evaluation>

(Measurement of Content of Water-Insoluble Component)

The thickener powder A (1.3 kg) was dissolved in water (100 kg) under conditions of 25° C., 10 minutes, and 200 rpm, thereby obtaining a thickener aqueous solution having a concentration of 1.3% by mass. Next, the obtained thickener aqueous solution was filtered using a filter having an average pore diameter of 1 μm. Next, a water-insoluble component remaining on the filter was dried, and the mass of the water-insoluble component was measured. Next, the content of a water-insoluble component in the thickener powder A was calculated from the following expression.

Content (%) of water-insoluble component in thickener powder $A=100\times A/1.3$ Here, A in the expression represents the mass (kg) of the water-insoluble component remaining on the filter.

(Evaluation of Storage Stability of Thickener Aqueous Solution)

The thickener powder A (1.3 kg) was dissolved in water (100 kg) under conditions of 25° C., 10 minutes, and 200 rpm, thereby obtaining a thickener aqueous solution having a concentration of 1.3% by mass. The viscosity of the thickener aqueous solution was measured under conditions of 25° C. and a shear speed of 3.4 $s^{-1}$ using a B-type viscometer and found out to be 3,000 mPa·s.

Next, the obtained thickener aqueous solution (100 g) was fed into a lid-attached plastic container and stored with the lid closed for three days under a condition of a temperature of 25° C.

Next, the viscosity of the thickener aqueous solution which had been stored for three days was measured using a B-type viscometer at 25° C. and a shear speed of 3.4 $s^{-1}$. After that, the viscosity change percentage was calculated from the following expression, and the storage stability of the thickener aqueous solution was evaluated using the following standards.

Viscosity change percentage [%]=100×(viscosity after three-day storage)/(viscosity before three-day storage)

AA: The viscosity change percentage was equal to or more than 80% and less than 120%.

A: The viscosity change percentage was equal to or more than 120% and less than 150% or equal to or more than 50% and less than 80%.

C: The viscosity change percentage was equal to or more than 150% or equal to or more than 10% and less than 50%.

(Evaluation of Storage Stability of Water-Based Electrode Slurry)

Next, the obtained water-based electrode slurry (100 g) was fed into a lid-attached plastic container and stored with the lid closed for three days under a condition of a temperature of 25° C.

Next, for the water-based electrode slurry before storage and the water-based electrode slurry after storage, the viscosity was measured using a B-type viscometer at 25° C. and a shear speed of 3.4 $s^{-1}$. After that, the viscosity change percentage was calculated from the following expression, and the storage stability of the water-based electrode slurry was evaluated using the following standards.

Viscosity change percentage [%]=100×(viscosity after three-day storage)/(viscosity before three-day storage)

AA: The viscosity change percentage was equal to or more than 80% and less than 120%.

A: The viscosity change percentage was equal to or more than 120% and less than 150% or equal to or more than 50% and less than 80%.

B: The viscosity change percentage was equal to or more than 150% or equal to or more than 10% and less than 50%.

C: The water-based electrode slurry was separated by the above-described storage test (visually determined).

The obtained results are shown in Table 1.

(Evaluation of Viscosity Variation of Water-Based Electrode Slurry)

The viscosity variation of the water-based electrode slurry was evaluated as described below. First, five water-based electrode slurries under the same conditions were prepared as samples. Next, for the obtained water-based electrode slurries, the viscosity was measured using a B-type viscometer at 25° C. and a shear speed of 3.4 $s^{-1}$, the maximum variation degree was calculated from the following expression, and the variation of the water-based electrode slurry depending on lots was evaluated.

Maximum variation degree (mPa·s)=(maximum viscosity among five samples)−(minimum viscosity among five samples)

AA: The maximum variation degree was less than 500 mPa·s.

A: The maximum variation degree was equal to or more than 500 mPa·s and less than 1,000 mPa·s.

C: The maximum variation degree was equal to or more than 1,000 mPa·s.

(Appearance Evaluation of Negative Electrode)

The surface of the obtained negative electrode was observed using an optical microscope at a magnification of 100 times, and the presence and absence of aggregates was investigated at random five places on the surface of the negative electrode. Next, the appearance of the negative electrode was evaluated using the following standards.

AA: No aggregates were observed in all of the five places, and the appearance was visually favourable.

A: A total of one aggregate was observed, but the appearance was visually favourable.

C: A total of two aggregates were observed, and the appearance was visually unfavourable.

Examples 2 and 3

Thickener powder A, thickener aqueous solutions, water-based electrode slurries, and negative electrodes were respectively produced under the same conditions as in Example 1 except for the fact that the average pore diameter of the filter was changed in the production of the thickener powder A and the content of the water-insoluble component was changed to a value shown in Table 1 and were evaluated respectively. The obtained results are shown in Table 1.

Comparative Example 1

A thickener aqueous solution, a water-based electrode slurry, and a negative electrode were produced under the same conditions as in Example 1 except for the fact that carboxymethyl cellulose powder (MAC series of SUN-ROSE (registered trademark) manufactured by Nippon Paper Industries Co., Ltd.) was used instead of the thickener powder A and were evaluated respectively. The obtained results are shown in Table 1.

Comparative Example 2

<Preparation of Thickener Aqueous Solution B>

First, carboxymethyl cellulose powder (MAC series of SUNROSE (registered trademark) manufactured by Nippon Paper Industries Co., Ltd.) was dissolved in ion-exchange water at 20° C., thereby obtaining a thickener aqueous solution having a concentration of 1.3% by mass. Next, the obtained thickener aqueous solution was filtered using a filter having an average pore diameter of 1 µm, thereby obtaining a thickener aqueous solution B.

<Production of Water-Based Electrode Slurry>

(1) Step 1

Graphite (960 g) which was a negative electrode active material and carbon black (10 g) which was an auxiliary conductive agent were injected into a sun-and-planet motion-type planetary mixer.

Next, the components were dry-mixed at 20° C. for 60 minutes, thereby obtaining a powder mixture.

(2) Step 2

Next, water and the thickener aqueous solution B were added to the sun-and-planet motion-type planetary mixer in which Step 1 had been completed. After that, the components were wet-mixed under conditions of a rotation speed of 0.15 m/sec, a revolution speed of 0.04 m/sec, and a temperature of 20° C. for two minutes, thereby accustoming water to the powder mixture.

(3) Step 3

Next, water and the thickener aqueous solution B were added to the sun-and-planet motion-type planetary mixer in which Step 2 had been completed. After that, the components were wet-mixed under conditions of a rotation speed of 4.50 m/sec, a revolution speed of 1.50 m/sec, and a temperature of 20° C. for 40 minutes, thereby obtaining a slurry precursor.

(4) Step 4

Next, a styrene butadiene rubber (SBR) aqueous solution having a solid content concentration of 40% by mass obtained by dispersing SBR in water was prepared. The obtained SBR aqueous solution (50 g) and the thickener aqueous solution B were added to the sun-and-planet motion-type planetary mixer in which Step 3 had been completed. The total of the thickener powder included in the thickener aqueous solution B that was used in Steps 2 to 4 was set to 10 g.

After that, the components were wet-mixed under conditions of a rotation speed of 0.25 m/sec, a revolution speed of 0.08 m/sec, and a temperature of 20° C. for 10 minutes.

(5) Step 5

Next, vacuum defoaming was carried out, thereby obtaining a water-based electrode slurry.

Meanwhile, the solid content concentration of the water-based electrode slurry was adjusted to 50% by mass by adjusting the amount of water that was added in the respective steps.

<Production of Negative Electrode>

The obtained water-based electrode slurry was applied onto a single surface of a copper foil which was a collector using a die coater and dried. Next, the obtained electrode was pressed, thereby obtaining a negative electrode.

TABLE 1

| | Characteristics of thickener powder used Content of water-insoluble component [% by mass] | Storage stability of thickener aqueous solution | Storage stability of water-based electrode slurry | Viscosity variation of water-based electrode slurry | Appearance of negative electrode |
|---|---|---|---|---|---|
| Example 1 | 0.07 | AA | AA | AA | AA |
| Example 2 | 0.30 | AA | AA | AA | A |
| Example 3 | 0.80 | A | A | A | A |
| Comparative Example 1 | 1.5 | C | C | C | C |
| Comparative Example 2 | 1.5 | AA | C | C | AA |

Priority is claimed on the basis of Japanese Patent Application No. 2016-044067, filed on Mar. 8, 2016, the content of which is incorporated herein by reference.

The invention claimed is:

1. A thickener powder for thickening a water-based electrode slurry for a lithium-ion battery, the thickener powder comprising:
   a cellulose-based water-soluble polymer,
   wherein a content of a water-insoluble component in the thickener powder, which is calculated from the following Condition 1, is equal to or more than 0.01% by mass and equal to or less than 0.5% by mass, and
   the water-insoluble component includes a fiber component derived from the cellulose-based water-soluble polymer;
   Condition 1: the thickener powder is dissolved in water, thereby obtaining a thickener aqueous solution having a concentration of 1.3% by mass, then, the thickener aqueous solution is filtered using a filter having an average pore diameter of 1 µm, then, the water-insoluble component remaining over the filter is dried, and a mass of the water-insoluble component is measured, and then the content of the water-insoluble component in the thickener powder is calculated.

2. The thickener powder for a lithium-ion battery according to claim 1,
   wherein the cellulose-based water-soluble polymer includes at least one selected from the group consisting of carboxymethyl cellulose and a carboxymethyl cellulose salt.

3. The thickener powder for a lithium-ion battery according to claim 1,
   wherein a viscosity calculated from the following Condition 2 is equal to or more than 10 mPa·s and equal to or less than 20,000 mPa·s;
   Condition 2: the thickener powder is dissolved in water, thereby obtaining a thickener aqueous solution having a concentration of 1.3% by mass, and then the viscosity of the thickener aqueous solution is measured using a B-type viscometer under conditions of 25° C. and a shear rate of 3.4 $s^{-1}$.

4. The thickener powder for a lithium-ion battery according to claim 1,
   wherein the thickener powder is obtained by dissolving the cellulose-based water-soluble polymer in the water-based medium to obtain a cellulose-based water-soluble aqueous solution, thereafter filtering the cellulose-based water-soluble aqueous solution using a filter having an average pore diameter of 1 µm, thereafter drying the filtered cellulose-based water-soluble aqueous solution to remove the fiber component derived from the cellulose-based water-soluble polymer.

5. A water-based electrode slurry comprising:
an electrode active material being selected from a positive electrode active material and a negative electrode active material;
a water-based binder;
the thickener powder for a lithium-ion battery according to claim 1; and
a water-based medium,
wherein the thickener powder for a lithium-ion battery is dissolved in the water-based medium.

6. An electrode for a lithium-ion battery, comprising:
an electrode active material being selected from a positive electrode active material and a negative electrode active material;
a water-based binder; and
the thickener powder for a lithium-ion battery according to claim 1.

7. A lithium-ion battery comprising at least:
a positive electrode;
an electrolyte; and
a negative electrode,
wherein at least one of the positive electrode and the negative electrode includes the electrode for a lithium-ion battery according to claim 6.

8. A method for manufacturing a water-based electrode slurry for a lithium-ion battery, including an electrode active material being selected from a positive electrode active material and a negative electrode active material, a water-based binder, a thickener, and a water-based medium, the method comprising:
a step of preparing a water-based electrode slurry by mixing the electrode active material, the water-based binder, a thickener powder, and the water-based medium,
wherein the thickener powder is obtained by dissolving the cellulose-based water-soluble polymer in the water-based medium to obtain a cellulose-based water-soluble aqueous solution, thereafter filtering the cellulose-based water-soluble aqueous solution using a filter having an average pore diameter of 1 μm, thereafter drying the filtered cellulose-based water-soluble aqueous solution to remove the fiber component derived from the cellulose-based water-soluble polymer.

9. The method for manufacturing a water-based electrode slurry for a lithium-ion battery according to claim 8,
wherein the step of preparing the water-based electrode slurry includes
a step of preparing a mixture including the electrode active material and the thickener powder by dry-mixing the electrode active material and the thickener powder in a powder state,
a step of preparing a slurry precursor by adding one or more liquid components selected from the water-based medium and an emulsion aqueous solution including the water-based binder to the mixture and wet-mixing the components in the mixture, and
a step of preparing the water-based electrode slurry by further adding one or more liquid components selected from the water-based medium and the emulsion aqueous solution including the water-based binder to the slurry precursor and wet-mixing the components in the slurry.

10. A method for manufacturing an electrode for a lithium-ion battery, comprising:
a step of preparing a water-based electrode slurry using the method for manufacturing a water-based electrode slurry for a lithium-ion battery according to claim 8; and
a step of forming an electrode active material layer over a base material by applying the obtained water-based electrode slurry over the base material, drying the applied water-based electrode slurry, and removing the water-based medium.

* * * * *